United States Patent
Dadeppo et al.

(10) Patent No.: US 9,762,777 B2
(45) Date of Patent: Sep. 12, 2017

(54) DEVICE WITH A CAMERA UNIT

(71) Applicant: Huf Hülsbeck & Fürst GmbH & Co. KG, Velbert (DE)

(72) Inventors: Lynn Dadeppo, Bloomfield Hills, MI (US); Ehab Kamal, Novi, MI (US); Steve Bauer, Clarkston, MI (US); David Newkirk, West Bloomfield, MI (US)

(73) Assignee: HUF HÜLSBECK & FÜRST GMBH & CO. KG, Velbert (DE)

( * ) Notice: Subject to any disclaimer, the term of this patent is extended or adjusted under 35 U.S.C. 154(b) by 186 days.

(21) Appl. No.: 14/260,526

(22) Filed: Apr. 24, 2014

(65) Prior Publication Data
US 2014/0320654 A1   Oct. 30, 2014

Related U.S. Application Data

(60) Provisional application No. 61/815,489, filed on Apr. 24, 2013.

(51) Int. Cl.
*B60R 11/04* (2006.01)
*H04N 5/225* (2006.01)
(Continued)

(52) U.S. Cl.
CPC ........... *H04N 5/2252* (2013.01); *B60R 11/04* (2013.01); *G02B 27/0006* (2013.01);
(Continued)

(58) Field of Classification Search
CPC .................................................... H04N 5/2251
See application file for complete search history.

(56) References Cited

U.S. PATENT DOCUMENTS 6,382,847 B1   5/2002   Takada
6,819,231 B2   11/2004   Berberich et al.
(Continued)

FOREIGN PATENT DOCUMENTS

CN   1897603 A1   1/2007
DE   10234483 A1   2/2004
(Continued)

OTHER PUBLICATIONS

Office Action from Chinese Patent Application No. 201310119970 dated Nov. 19, 2014.
(Continued)

*Primary Examiner* — Nam Pham
(74) *Attorney, Agent, or Firm* — Calfee, Halter & Griswold LLP (57) ABSTRACT

The invention relates to a device with a camera unit, serving to take pictures of the outside of a motor vehicle, and a lid element movable via a drive between a closed position, in which the lid element covers an opening of the device and an open position, in which the lid element exposes the opening, wherein in the closed position of the lid element the camera unit is inaccessible from the outside behind the lid element and in the open position of the lid element pictures can be taken. According to the invention provision is made for the lid element to be an actuating element for the camera unit in order to move the camera unit between an idle position and an operating position.

12 Claims, 3 Drawing Sheets

(51) Int. Cl.
*G02B 27/00* (2006.01)
*B60R 11/00* (2006.01)

(52) U.S. Cl.
CPC . *B60R 2011/004* (2013.01); *B60R 2011/0082* (2013.01); *B60R 2011/0092* (2013.01); *B60R 2011/0094* (2013.01)

(56) References Cited

U.S. PATENT DOCUMENTS

| | | | | |
|---|---|---|---|---|
| 8,118,501 | B2 | 2/2012 | Buschmann | |
| 2003/0146831 | A1* | 8/2003 | Berberich | B60R 11/04 340/461 |
| 2004/0130622 | A1 | 7/2004 | Lang et al. | |
| 2006/0171704 | A1* | 8/2006 | Bingle | B60R 11/04 396/419 |
| 2006/0256459 | A1 | 11/2006 | Izabel et al. | |
| 2007/0013555 | A1 | 1/2007 | Sung et al. | |
| 2008/0079848 | A1 | 4/2008 | Kung et al. | |
| 2009/0231430 | A1 | 9/2009 | Buschmann | |
| 2009/0309971 | A1 | 12/2009 | Schuetz | |
| 2013/0016219 | A1* | 1/2013 | Hahner | B60R 11/04 348/148 |
| 2014/0197649 | A1* | 7/2014 | Hansen | B60R 11/04 292/336.3 |

FOREIGN PATENT DOCUMENTS

| | | |
|---|---|---|
| DE | 202005017430 U1 | 10/2006 |
| DE | 102006048373 A1 | 4/2008 |
| DE | 102009039962 | 4/2010 |
| DE | 102009008283 | 8/2010 |
| EP | 1003068 A1 | 5/2000 |
| EP | 1332923 A2 | 8/2003 |
| JP | 4139527 B2 | 8/2008 |
| TW | 200815894 A | 4/2008 |
| WO | 2008022717 | 2/2008 |
| WO | 2010091657 A1 | 8/2010 |
| WO | 2011086132 A1 | 7/2011 |
| WO | 2012065603 A1 | 5/2012 |

OTHER PUBLICATIONS

First Office Action from CN Application No. 201310119979X dated Jan. 7, 2015.
International Search Report from International Application No. PCT/EP2011/058948 dated Dec. 16, 2011.
International Search Report and Written Opinion from International Application No. PCT/EP2011/058948 dated Jan. 2, 2012.
Office Action from U.S. Appl. No. 13/703,465 dated Jun. 25, 2015.
Response to Office Action from U.S. Appl. No. 13/703,465 dated Nov. 23, 2015.
Office Action from U.S. Appl. No. 13/845,451 dated Oct. 7, 2015.
Office Action from U.S. Appl. No. 13/845,436 dated Oct. 9, 2015.
Office Action from European Application No. 11723056.5 dated Oct. 21, 2015.
Office Action from EP Application No. 14165885.6 dated Nov. 30, 2015.
Notice of Allowance from U.S. Appl. No. 13/845,451 dated May 6, 2016.
Response to Office Action from U.S. Appl. No. 13/845,436 dated Feb. 8, 2016.
Examiner initiated interview summary from U.S. Appl. No. 13/703,465 dated Feb. 26, 2016.
Office Action from U.S. Appl. No. 13/703,465 dated Mar. 11, 2016.
Response to Office Action from U.S. Appl. No. 13/703,465 dated Jun. 10, 2016.
Office Action from U.S. Appl. No. 13/845,436 dated Apr. 21, 2016.
Response to Office Action from U.S. Appl. No. 13/845,436 dated Jul. 21, 2016.
Notice of Allowance from U.S. Appl. No. 13/703,465 dated Aug. 10, 2016.
Notice of Allowance from U.S. Appl. No. 13/845,436 dated Aug. 16, 2016.

* cited by examiner

DEVICE WITH A CAMERA UNIT

CROSS-REFERENCE TO RELATED APPLICATIONS

This application claims priority to and any other benefit of U.S. Provisional Application No. 61/815,489 filed Apr. 24, 2013 , the entire disclosure of which is incorporated herein by reference.

DESCRIPTION OF THE FIGURES

According to the invention the characteristics of the description and of the claims of the device according to the invention as well as of the method according to the invention may form an essential contribution to the actuation of the device both individually and in the most varied combinations. Further, invention-improving measures will now be explained in detail together with the description of the preferred embodiment of the invention with reference to the figures, in which:

DESCRIPTION

This Detailed Description merely describes exemplary embodiments in accordance with the general inventive concepts and is not intended to limit the scope of the invention or the claims in any way. Indeed, the invention as described by the claims is broader than and unlimited by the exemplary embodiments set forth herein, and the terms used in the claims have their full ordinary meaning The general inventive concepts will now be described with occasional reference to the exemplary embodiments of the invention. This general inventive concept may, however, be embodied in different forms and should not be construed as limited to the embodiments set forth herein. Rather, these embodiments are provided so that this disclosure will be thorough and complete, and will fully convey the scope of the general inventive concepts to those skilled in the art.

Unless otherwise defined, all technical and scientific terms used herein have the same meaning as commonly understood by one of ordinary skill in the art encompassing the general inventive concepts. The terminology set forth in this detailed description is for describing particular embodiments only and is not intended to be limiting of the general inventive concepts. As used in this detailed description and the appended claims, the singular forms "a," "an," and "the" are intended to include the plural forms as well, unless the context clearly indicates otherwise.

Unless otherwise indicated, all numbers expressing quantities of ingredients, properties such as molecular weight, reaction conditions, percentages and so forth as used in the specification and claims are to be understood as being modified in all instances by the term "about." Accordingly, unless otherwise indicated, the numerical properties set forth in the specification and claims are approximations that may vary depending on the suitable properties sought to be obtained in embodiments of the present invention. Notwithstanding that the numerical ranges and parameters setting forth the broad scope of the general inventive concepts are approximations, the numerical values set forth in the specific examples are reported as precisely as possible. Any numerical values, however, inherently contain certain errors necessarily resulting from error found in their respective measurements.

The device relates to a device used for taking pictures of the outside of a motor vehicle, with a camera unit which can serve to record the surroundings of a motor vehicle. The device comprises a lid element, which can be moved via a drive between a closed position, in which the lid element covers an opening of the device, and an open position, in which the lid element exposes the opening. In the closed position of the lid element the camera unit is behind the lid element and not accessible from outside and in the open position of the lid element the taking of pictures can be performed through the opening. Furthermore, the invention reveals a method for actuating a device used to take pictures of the outside f a motor vehicle, in which the device has a camera unit which can be used to record pictures of the surroundings of a motor vehicle.

Devices for a camera unit which can be used to record pictures of the surroundings of a motor vehicle are known in principle from the art. The devices of this kind comprise a camera unit, which is used in the context of assisted parking of motor vehicles or as rear view or front view camera, and a lid element, which is moved between a closed position, in which the lid element hides the camera unit, and an open position, in which the lid element enables the camera unit to view the area in front of it. If the camera unit is needed, the lid element moves into the open position, in which the desired area behind or in front of the motor vehicle is pictorially recorded by the camera unit and can be displayed on a screen for the driver of the motor vehicle. When the camera unit is no longer needed, the lid element can be pivoted into the protected closed position.

A device of this kind is known from the publication WO 2011/154290 A2 which comprises a lid element for hiding an opening of the device, through which the camera unit can perform the recording of pictures. The lid element can be moved by means of a drive between a closed position, in which the lid element hides an opening of the device, and an open position, in which the lid element exposes the opening. With the known device only the lid element is moved, the camera unit, however, does not change its position and is rigidly arranged in the device, so that only the lid element is moved for taking pictures, thereby enabling the view for the camera. With this arrangement it was found to be disadvantageous that the camera which is immovable and always directed to the outside, is not sufficiently protected against the influences of the weather.

The invention is therefore based on the objective requirement to propose a simple, cost-effected and compact device with a camera unit, which overcomes the said disadvantage. In particular the device shall be able to receive the camera unit in an idle position so that it is well protected. In particular, it shall be avoided that dirt penetrating into the device despite the fact that the opening is closed when the lid element is closed, cannot cause contamination of a lens of the camera unit.

The present invention provides for the lid element itself to be an actuating element for the camera unit in order to move the camera unit between an idle position and an operating position. The inventive idea consists in that the camera unit can be pivoted into the idle position in such a way that the camera unit is facing away from the outside of the motor vehicle. In particular, it is important for front view cameras which are exposed to external influences such as strong wind and moisture, that the camera unit with its lens is turned away from the outside, in order to be reliably protected. Provision may be made for the camera unit when being moved into the operating position to be pivoted such that it faces the outside in order to ensure optimal taking of pictures. When being moved back into the idle position the camera unit is pivoted about an angle, for example by 90° in direction of the interior of the device, thereby arranging for the camera unit to be well protected inside the device. Advantageously, the drive starts only the lid element moving. The camera unit is exclusively driven by the lid element as the actuating element, which means that the drive is an indirect drive because the movement of the drive is transferred exclusively by means of the lid element to the camera unit. When the lid element is moved by the drive between a closed position, in which the opening of the device is closed by the lid element, and an open position, in which the opening of the device is exposed by the lid element for the camera unit, the lid element (and not the drive directly) drives the camera unit, as a result of its movement, between the idle position and the operating position. When the lid element is in the closed position, the camera therefore is in the idle position, in which the camera unit is protected, lying behind the lid element and facing away from the outside of the motor vehicle. When the lid element is moved by the drive into the open position, the lid element, as a result of its movement, then drives the camera unit into the operating position, in which pictures can be taken and in which the camera unit faces the outside of the motor vehicle. When the lid element is returned back into the closed position by the drive, this movement of the lid element again causes a movement of the camera unit which thereby is returned into the idle position. The lid element itself thus serves as a necessary actuating element between the drive and the movable camera unit in order to be able to transfer the drive movement indirectly from the drive onto the camera unit.

This has the advantage that the device only needs one drive for driving the lid element directly and the camera unit indirectly, wherein the camera unit is moved between the idle position and the operating position solely by the lid element as actuating element. The drive for moving the lid element does not require much space and not much installation space within the motor vehicle. In this way it is possible to devise a device which is very compact and space-saving. Advantageously, the drive can be arranged spaced apart from the camera unit, because the drive only drives the lid element but not directly the camera unit. This is a way of avoiding that the drive which often is implemented as an electromagnetic drive, impacts upon the function of the camera unit due its magnetic radiation. Errors during the taking of pictures can thus be reliably avoided because of the existing distance. In addition provision may be made that during the movement of the lid element between the closed position and the open position, the outside surface of the lid element is always, in any position, outside the motor vehicle. It can thus be ensured that the lid element during its movement into the respective position, remains outside the body of the vehicle so as not to damage the vehicle surface. Advantageously, a device of this kind can be employed in the rear and/or front area. A further advantage of this invention consists in that the outside surface of the lid element may comprise an inscription, in particular an emblem, a mark or a drawing, which is visible in any position of the lid element.

In addition it is an advantage that the camera unit can be moved into the idle position in which the camera unit with its lens is turned away from the outside, in order to be better protected against the ingress of dirt. Preferably, the camera unit is rotatably and/or pivotably fastened on or in the device. This may be effected, for example, via a joint or hinge. In this way the camera unit can be pivoted during its movement from the active position into the idle position such that the lens of the camera unit points in direction of the interior of the vehicle, i.e. facing away from the direction of taking pictures. The lens of the camera unit and thus the camera unit is therefore protectively arranged when in the idle position. Dirt particles which despite the covering or sealing may travel along the side of the lid element in direction of the camera unit, may perhaps reach the side of the camera housing but not directly in or rather on the camera lens. The rotatable and/or pivotable arrangement of the camera unit also offers the possibility of pivoting and/or rotating the camera unit during opening the lid element in such a way that the camera unit can be aligned relative to the environment to be monitored in an optimal manner thus adopting the best possible direction for taking pictures.

The provided lid element may comprise at least one drive lever driven by the drive in order to move the lid element between the closed position and the open position. Advantageously the drive lever may be rotatably and/or pivotably arranged on the lid element. According to the invention the drive is defined as part of the lid element. To this end the drive may advantageously comprise a gear unit which may be used to drive and/or support the lid element, in particular the drive lever. In terms of the present patent application the gear unit is defined as part of the drive. The effect of the drive may be transferred onto the lid element via the drive lever. The drive lever may be mounted on the gear unit so as to be rotatable about a driving axis. As such the drive lever may be mounted on a shaft which is defined by the drive shaft. The driving axis may be fixedly arranged on the device so that the drive lever is rotated about it.

The gear unit according to the invention may be implemented as a tooth wheel drive and/or a worm gear. Moreover, the gear unit may be configured such that the gear unit is self-locking, for example it may be configured as a worm gear. The drive also comprises a drive motor in order to put the gear unit into operation. The drive motor may be configured as an electromotor, a linear motor, an electromagnetic transmission element or the like. The rotating effect of the drive motor may be transferred to a first tooth wheel of the gear unit for increasing the torque. The first tooth wheel may be in mechanical engagement with a second and/or third tooth wheel. In this way a desired transmission ratio may be achieved for rotating the drive lever about the driving axis.

According to the invention the drive lever may be configured essentially in the shape of an L or a V. One end of the drive lever may be mounted directly on the gear unit, in particular on the second or third tooth wheel so as to be rotatable about the driving axis. It is feasible for the drive lever to be non-rotatably connected or attached to a tooth wheel of the gear unit and to be rotated together with the tooth wheel about the driving axis. To this end one shank of the L-shaped or V-shaped drive lever may be fastened to two or more points on the tooth wheel in order to ensure a higher stability of the rotating movement. The second shank of the drive lever may be used as a pivot arm of the lid element. At another end, the drive lever or the second shank of the drive lever may be pivotably mounted on the lid element about a bearing axis, wherein the bearing axis may be configured so as to be fixed relative to the lid element. Advantageously, this may be effected via a joint. In this way it is possible for the lid element, during its movement into the open position, to be pivoted not only about the driving axis in the upward direction but also in the downward direction relative to the vehicle surface. Thus it is ensured that the lid element is initially moved away slightly from the vehicle surface and then almost in parallel to the vehicle surface and during the movement always remains spaced apart from the vehicle surface.

According to the invention provision is made for the lid element to comprise at least one actuating lever—in particular additionally to the already mentioned drive lever—which can interact with the camera unit in such a way that the camera unit is moved between the idle position and the operating position. According to the invention the actuating lever is defined as part of the lid element. Whilst the drive lever may be arranged at the top of the lid element, in order to pivot the lid element upwards into the open position, the actuating lever may be arranged at the bottom of the lid element, in order to pull the camera unit along into the operating position, when the lid element is moved into the open position. With this arrangement the actuating lever may be essentially configured in the shape of an L or a V. At one end the actuating lever or a first shank of the actuating lever may be pivotably mounted on the lid element about an actuating axis, wherein the actuating axis may be configured so as to be fixed relative to the lid element. Advantageously, this may be effected via a joint or hinge. Another end of the actuating lever may be advantageously non-rotatably connected with the camera unit. The actuating lever may be fixedly mounted at one point between the first and second shank on a fastening axis of the device, so that the actuating lever is altogether rotated about the fastening axis. The camera unit together with the actuating lever is pivoted about the fastening axis between the idle position and the operating position. When the lid element is pivoted the movement, at least in part, is transferred onto the actuating lever. The actuating lever is, sort of, pulled along by the lid element so that the actuating lever is pivoted about the fastening axis. If the lid element is then pivoted from the closed position into the open position, this movement acts upon the actuating lever in such a way that this is rotated together with the camera unit about the fastening axis. To this end provision may be made, according to the invention, for the actuating lever and the camera unit to form a common constructional unit.

According to a preferred further development of the invention the actuating lever may comprise a slide for receiving a camera of a camera unit in order to exchangeably receive the camera. The camera can be attached to the slide in a positively locking or force-locked manner by means a snap-on connection or bayonet connection. Further the camera unit may comprise an adapter for the camera, in order to be able to receive different camera models. The adapter can also be received on or in the slide.

Further, a mounting member may be provided in the form of a first housing shell, on which the drive and/or the gear unit can be arranged. The drive lever in turn can be mounted on the gear unit so as to be pivotable about the driving axis, wherein the driving axis is fixedly arranged on the mounting member. Then the lid element can be fastened via a rotary joint on the drive lever. Further, the actuating lever can be connected with the lid element, wherein the actuating lever can be advantageously connected with the camera unit. The actuating lever is then positioned on the fastening axis on the mounting member. The fastening axis may be fixedly arranged on the mounting member. The device is thus constructed from a number of modules and mounted as a single unit on the motor vehicle. The mounting member may further comprise assembly means which may be used to attach the device to the motor vehicle, for example to a recess in the vehicle body or to a structural part of the motor vehicle. Advantageously, the mounting member may be attached from outside, in particular via a snap-on connection and/or in a positively locking and/or forced-locked manner to the motor vehicle.

Furthermore, a cover may be provided on the mounting member in the form of a second housing shell. The cover may essentially cover and/or seal the camera unit and/or the drive and/or the gear unit. The mounting member and the cover may advantageously enclose the device such that it is sealed. For assembly purposes the device can be removed as a whole, wherein only the cover needs be removed in order to reach the device.

A seal may be provided between the mounting member and the cover. This will prevent moisture from penetrating into the interior of the vehicle, for example when the lid is in the open position. A protective membrane may be additionally provided on the outside at the opening, in particular on the mounting member, which sealingly covers the free space between the opening and device in order to prevent dirt particles and moisture from penetrating to the camera unit and inhibiting the drive. Furthermore, provision may be made for a collar element to be provided at the opening against which the lid element may be supported in the closed position. When the lid element is supported against the collar element, the collar element can have a cushioning effect and/or serve as a seal. The seal and/or the protective membrane and/or the collar element may be formed from an elastic material.

The mounting member and/or the cover and/or the lid element and/or the gear unit and/or the drive lever and/or the actuating lever may be formed from a plastic, metal, composite or similar, which in particular is of a greater hardness than the material of the seal and/or the protective membrane and/or the collar element.

In addition, it is feasible that the device comprises a positional detection which can detect at least the closed position and the open position of the lid element. The camera unit may be activated in accordance with the detection. In the closed position of the lid element the camera unit may be switched off, and in the open position of the lid element the camera unit may be switched on.

Further, the requirement according to the invention is met by the disclosed methods. The method may serve to actuate the device according to the invention. The method may comprise several steps. To start with a drive, in particular an electromotor of the drive, may be activated which starts the operation of a gear unit. The drive, in particular the gear unit, is destined to initially only drive the lid element. Furthermore, the lid element is configured to also move the camera unit between an idle position and an operating position, wherein this movement is exclusively effected by the lid element. In the first step the drive only starts the lid element moving. Thereafter, the camera unit is driven exclusively by the lid element as the actuating element. According to the invention the lid element is moved by the drive from a closed position into an open position and drives the camera unit between the idle position and the operating position. In the closed position of the lid element the camera is in the idle position. When the lid element is moved into the open position, the lid element drives the camera unit into the operating position. In other words, the lid element pulls the camera unit with it in direction of the outside, i.e. into the operating position. When the lid element is returned by the drive into the closed position, the camera unit is returned into the idle position.

In the figures identical symbols are used for identical technical characteristics of the invention.

Figure 1:
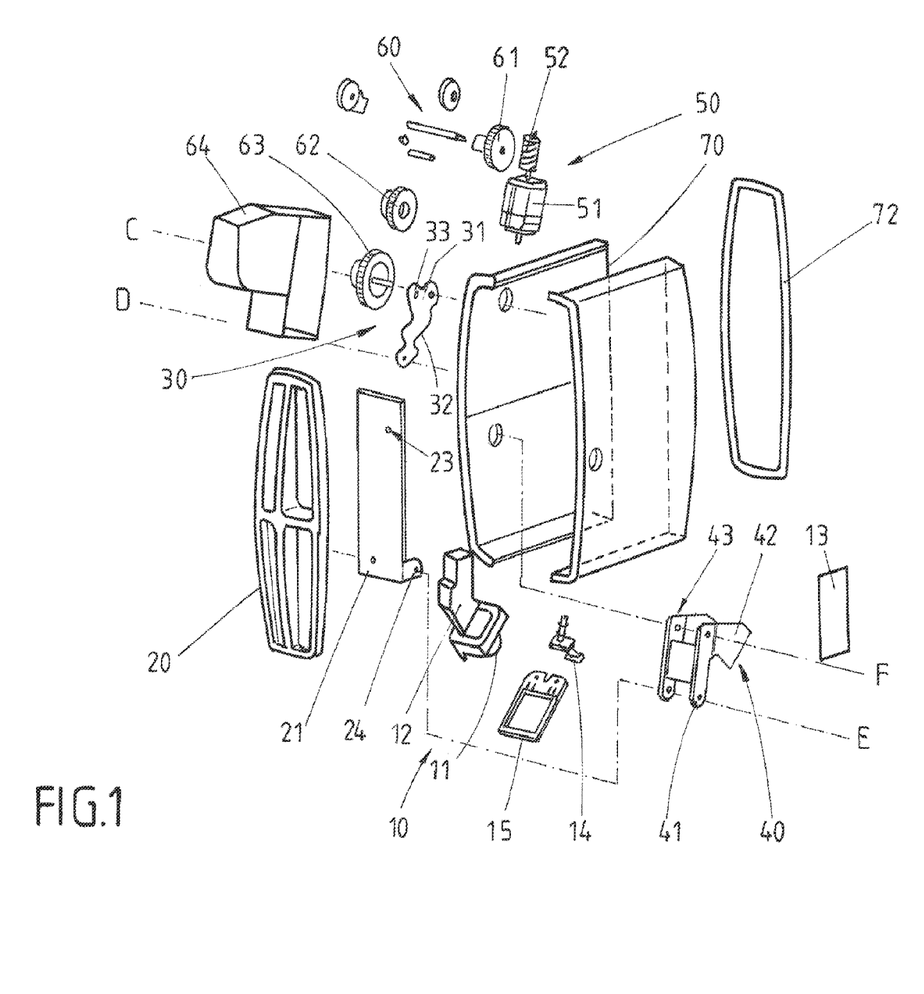
FIG. 1 shows the device according to the invention in an explosive view.

FIG. 1 shows the device 100 according to the invention in an explosive view comprising a lid element 20, which is used as an actuating element for the camera unit 10. The inventive idea consists in that the camera unit 10 is driven exclusively by the lid element 20 as the actuating element between an idle position A and an operating position B, which are shown in the FIGS. 2 and 3. The device 100 comprises a drive 50 which is provided only for driving the lid element 20 between a closed position I and an open position II in order to close or open an opening 2 in the device 100, through which the camera unit 10 records pictures. The lid element 20 is mechanically connected with the camera unit 10 such that when the lid element 20 is driven between the closed position I and the open position II, the camera unit 10 is moved between the idle position A and the operating position B.

The lid element 20 according to the invention is configured to comprise a drive lever 30 and an actuating lever 40. The drive lever 30 acts as a transmission element between the drive 50 and the lid element 20, and the actuating lever 40 acts as a transmission element between the camera unit 10 and the lid element 20. The lid element 20 advantageously may be an emblem of the motor vehicle. On the inside of the lid element 20 a fastening element 21 is provided, which is equipped with fastening means 23, 24 for the pivotable arrangement of the drive lever 30 about a bearing axis D and of the actuating lever 40 about an actuating axis E. The bearing axis D and the actuating axis E extend for example in parallel to each other and in parallel to the extension plane of the lid element 20. The fastening means 23, 24 according to one embodiment are configured as rotary joints. The fastening means 23 for the drive lever 30 is arranged in the upper part of the fastening element 21 and the fastening means 24 for the actuating lever 40 is arranged in the lower part of the fastening element 21. The fastening means 23, 24 ensure that the movement of the lid element 20 between the closed position I and the open position II is defined at least partly by a pivotal movement about the bearing axis D and a pivotal movement about the actuating axis E.

One end 32 of the drive lever 30, which faces the lid element 20, is rotatably mounted on the lid element 20. Another end 31 of the drive lever 30 which faces the drive 50, is connected via a gear unit 60 with the drive 50 such that the drive lever 30 can be pivoted about a driving axis C. The drive lever 30 is mounted on a shaft, which is defined by the driving axis C which extends in parallel with the bearing axis D. The gear unit 60 according to the invention advantageously is configured to both drive and support the lid element 20 via the drive lever 30.

Further, the drive 50 according to the invention is arranged spaced-apart from the camera unit 10. It is advantageous if the drive 50 which may emit electro-magnetic radiation, cannot negatively affect the operation of the camera unit 10. According to one embodiment of the invention the drive 50 comprises an electric motor 51 which via a drive shaft 52 causes the gear unit 60 to rotate. The motor 51 according to the invention may alternatively be configured as a purely mechanical transmission element, a linear motor or the like. The drive shaft 52, on the gear unit side, is provided with a worm gear, which is helically wound around the drive shaft 52. The worm gear of the drive shaft 52 is in mechanical engagement with a first tooth wheel 61 of the gear unit 60 and forms a self-locking worm gear. The first tooth wheel 61 in the embodiment shown, is configured as a spur gear. The drive shaft 52 extends vertically to the shaft of the first tooth wheel 61. The drive shaft 52 is rotated by the motor 51, in particular at high revolutions. The diameter of the tooth wheel 61 may be selected so as to be larger than the diameter of the drive shaft 52, in order to achieve a high transmission ratio. Further, the gear unit 60 may be configured with a second tooth wheel 62 and a third tooth wheel 63 in order to transmit a desired torque onto the drive lever 30. At the drive end the drive lever 30 is non-rotatably connected with the third tooth wheel 63, in order to achieve a stable rotation of the drive lever 30 about the driving axis C. Further a covering hood 64 may be optionally provided in order to enclose the drive 50 and the gear unit 60. Using a covering hood 64 will prevent oil or grease from the drive 50 or the gear unit 60 to reach any other parts of the interior space of the device 100, which could also contaminate the camera unit 10.

At one end 41 the actuating lever 40 of the lid element 20 is pivotably connected, as described above, with the lid element 20. At the other end 42 of the actuating lever 40 according to the invention a camera unit 10 is arranged. The camera unit 10 is non-rotatably connected with the actuating lever 40, enabling the camera unit 10 to be moved between the idle position A in FIG. 2 and the operating position B in FIG. 3 by a counter clockwise rotation about the fastening axis F. Advantageously, the actuating lever 40 includes a slide 42 for receiving a camera 11 of the camera unit 10, in order to exchangeably receive the camera 11. The slide 42 may comprise connecting means, in order to receive the camera 11 by means of a snap-on connection on the slide 42 in a positively locking or force-locked manner. Furthermore, the slide 42 may receive or retain an adapter 12 for the camera 11, in order to be able to employ different camera models. In addition the slide 42 may house an electronic unit 13 which may serve as a control electronics for the camera 11. Further, a wiper 14 may be optionally arranged on the slide 42 by means of a wiper frame 15 for cleaning the lens of the camera 11 as required.

Advantageously, the device 100 according to the invention comprises a mounting member 70 configured as a first housing shell, which is shaped in the form of a first housing shell for receiving the drive 50, the gear unit 60 and the drive lever 30 as well as the actuating lever 40. The drive lever 30 is pivotably arranged on the gear unit 60 about the driving axis C, which is fixedly mounted on the mounting member 70, in particular the first housing shell. Thereupon the lid element 20 is pivotably arranged on the driving lever 30 on the fastening means 23. The actuating lever 40 is also pivotably arranged on the lid element 20 on the fastening means 24, wherein the actuating lever 40 is non-rotatably connected with the camera unit 10 via the slide 42. Then the actuating lever 40 is positioned on the fastening axis F which is fixedly mounted on the mounting member 70, in particular the first housing shell, and which extends in parallel with the actuating axis E. Subsequently a cover 71 in the form of a second housing shell is attached to the mounting member 70 for covering the camera unit 10, the drive 50, the gear unit 60, the drive lever 30 and the actuating lever 40. The mounting member 70 and the cover 71 are held together by a fastening ring 72 so as to enclose the device 100 as a modular unit. According to the invention a seal may be provided between the mounting member 70 and the cover 71 in order, on the one hand, to seal the device 100 and on the other, to prevent that moisture penetrates into the interior of the motor vehicle, when the lid element 20 is in the open position II.

Figure 2:
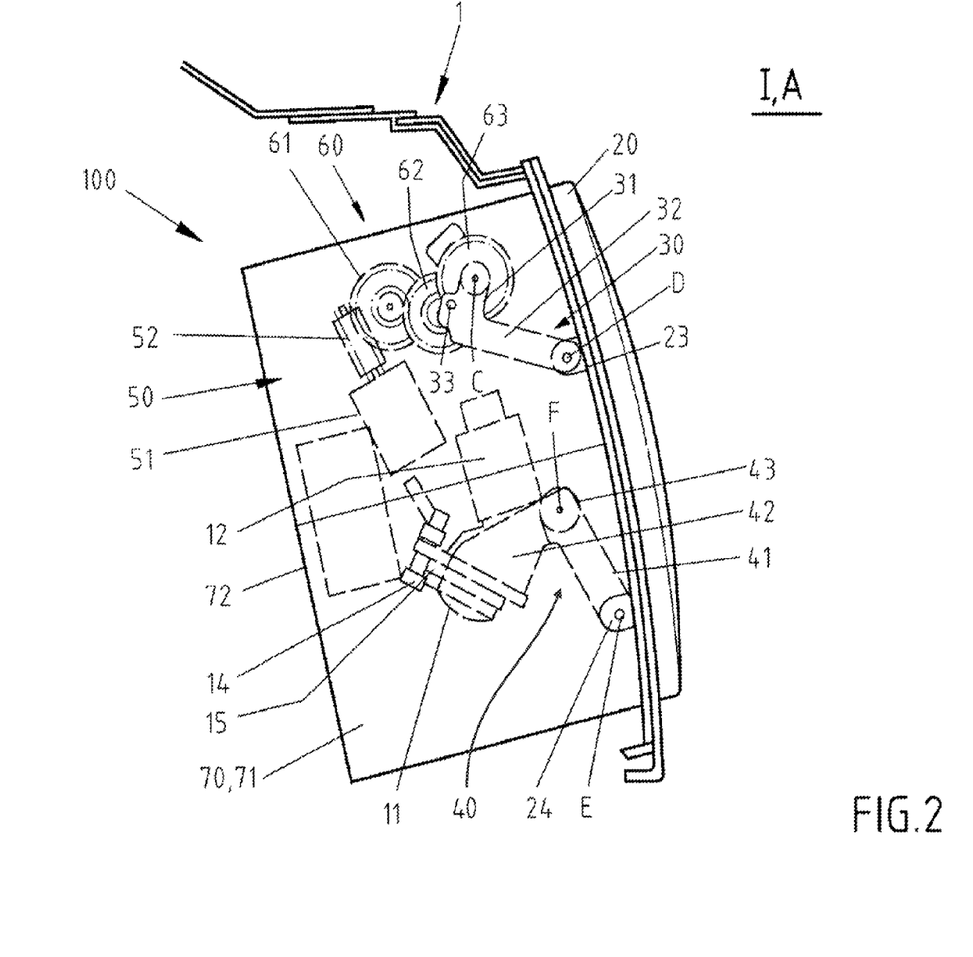
FIG. 2 shows the device according to the invention in a side view in the closed position of the lid element.
Figure 3:
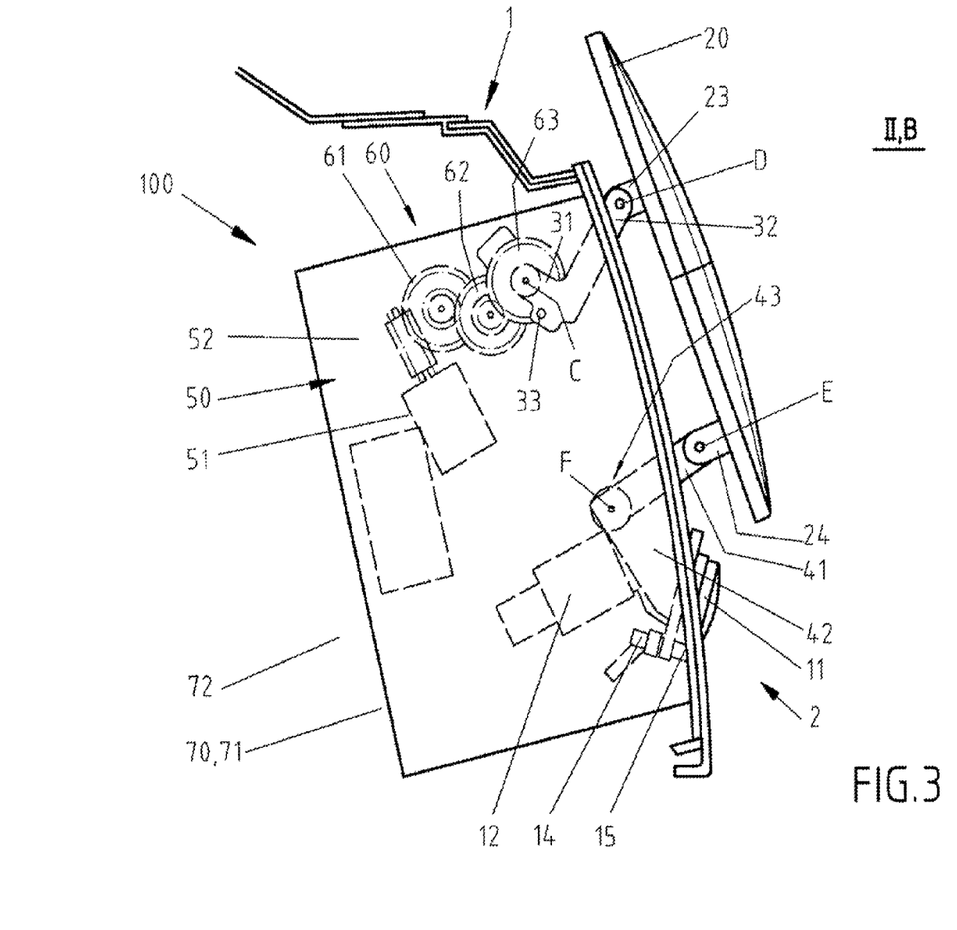
FIG. 3 shows the device according to the invention in a side view in the open position of the lid element.

Finally, the device 100 as a whole may be mounted on the motor vehicle. To this end the mounting member 70 may include mounting means with which the device 100 can be attached to the motor vehicle, for example to an opening in the vehicle body or to a structural part of the motor vehicle. With the aid of the mounting means the device 100 may be attached as a modular unit to the motor vehicle from the outside. The mounting means may form a snap-on connection and/or form-fit and/or force-fit of the device 100 or mounting member 70 with the motor vehicle or the opening in the vehicle body or in the structural part of the motor vehicle. In addition the mounting member 70 and the cover 71 may be assembled together in such a way that an opening 2 is formed which faces to the outside of the vehicle and through which the camera 11 in its operating position B can pictorially record the outside of the motor vehicle. According to the invention the lid element 20 covers the opening 2 in the closed position I, as shown in FIG. 2. In the open position II, as shown in FIG. 3, the lid element 20 exposes the opening 2. Advantageously a collar element may be provided on the opening 2 in the form of a seal, against which the lid element 20 may be supported in its closed position I, for example springily, in order to protect the device 100 from the effects of the weather in the closed position I of the lid element 20.

FIGS. 2 and 3 show the device 100 according to the invention in the assembled state, wherein FIG. 2 shows the lid element 20 in the closed position I and the camera unit 10 in the idle position A, and FIG. 3 shows the lid element 20 in the open position II and the camera unit 10 in the operating position B. In the idle position A in FIG. 2 the camera unit 10 lies protected inside the device 100 behind the lid element 20 and with the lens is facing away from the outside of the motor vehicle. In the operating position B in FIG. 3 the camera unit 10 has been swivelled to the outside, so that the lens of the camera 11 is facing the outside of the motor vehicle and has been partially moved out of the device 100. Especially in the front area of the motor vehicle camera units are exposed to strong effects of the weather. Moreover when the vehicle is travelling the lid element 20 may be subjected to strong winds so that over-pressure may be created in the device. In this respect it is particularly advantageously if the camera unit 10 according to the invention points towards the inside of the motor vehicle in the idle position A and is thus particularly well protected against external influences. Between the position in FIG. 2 and the position in FIG. 3 the camera unit 10 may be advantageously rotated by almost or even more than 90°.

As can be recognised from FIGS. 2 and 3, the drive lever 30 is essentially V-shaped. The drive lever 30 comprises a first shank 31 mounted on the gear unit 60. In the embodiment of the invention shown the drive lever 30 is non-rotatably attached to the third tooth wheel 63 of the gear unit 60 in at least two points. At the first point the first shank 31 of the drive lever 30 is connected with the rotary axis of the third tooth wheel 63 which axis defines the driving axis C. The second point which defines the apex 33 of the drive lever 30, is where the first shank 31 of the drive lever 30 is attached on the rim of the third tooth wheel 63. As a result, the drive lever 30 can perform a stable rotation about the driving axis C and can reliably move the lid element 20 between the open position II and the closed position I. At the second shank 32 of the drive lever 30 the lid element 20 is pivotably arranged on the bearing axis D by means of the fastening means 23. Firstly the lid element 20 together with the drive lever 30 is pivoted open anti-clockwise about the driving axis C, and secondly pivoted back in a reverse direction about the bearing axis D, so that the lid element 20 is initially removed from the vehicle surface 1 and then moved essentially parallel to the vehicle surface 1. In this way it is achieved that the lid element 20 does not damage the vehicle surface 1 when it is moved from the closed position I into the open position II.

In the embodiment of the invention shown in the FIGS. 2 and 3 the actuating lever 40 is again V-shaped. A first shank 41 of the actuating lever 40, as shown above, is pivotably mounted on the lid element 20 about an actuating axis F by means of the fastening means 24. At a second shank 42 of the actuating lever 40 a slide 42 is provided for the camera unit 10. The actuating lever 40 is rotatably mounted in an apex 43 between the first shank 41 and the second shank 42 about the fastening axis F, which is fixedly positioned on the mounting member 70. The camera unit 10 together with the slide 42 is pivoted exclusively about the fastening axis F between the idle position A in FIG. 2 and the operating position B in FIG. 3. When the lid element 20 is pivoted, the movement is transferred at least partly onto the actuating lever 40. The actuating lever 40 then pulls the camera unit 10 with it, which camera unit is pivoted about the fastening axis F, whilst the actuating lever 40 changes its relative position to the lid element 20 about the actuating axis E.

The operation of the device 100 according to the invention will now be explained with reference to the transition between the closed position I of the lid element 20 in FIG. 2 and the open position II in FIG. 3. According to the invention the activating action of the drive 50 is transferred via the gear unit 60 onto the drive lever 30. The drive lever 30 is pivoted anti-clockwise about the driving axis C. This rotary movement of the drive lever 30 is transferred onto the lid element 20, wherein the rotation of the lid element 20 about the driving axis C is braked due to the pivotable arrangement of the drive lever 30 on the lid element 20 and the weight of the camera unit 10 at the actuating lever 40. Starting from the position in FIG. 2, the lid element 20 begins to partially rotate about the bearing axis D. The movement of the lid element 20 causes the movement of the camera unit 10, which is pulled along via the actuating lever 40. During this movement the actuating lever 40 pivots relative to the lid element 20, wherein the camera unit 10 is rotated anti-clockwise exclusively about the fastening axis F. Therefore, as the lid element 20 is moved into the open position II in FIG. 3, only the lid element 20 drives the camera unit 10 into the operating position B, in which the taking of pictures can be performed and the camera unit 10 faces to outside. When the lid element 20 is driven back into the closed position I in FIG. 2, it alone drives the camera unit 10 back into the idle position A.

From the open position II of the lid element 20 with the camera unit 10 in the operating position B in FIG. 3, the lid element 20 again reaches the closed position I due to the reverse movement previously described. At the same time the camera unit 10 is moved into the idle position A in FIG. 2, in that the drive 50 is now operated in the reverse direction. This also causes the drive lever 30 to rotate clockwise about the driving axis C and the actuating lever 40 pulled along by the movement of the lid element 20 to also rotate clockwise about the fastening axis F.

According to the invention it is advantageous that the device 100 only requires one drive 50 for driving the lid element 20 and the camera unit 10, wherein the camera unit 10 is pulled along only by the lid element 20. Moreover, it is advantageous that the camera unit 10, in the idle position A, is positioned such that the camera 11 is facing away from the outside of the motor vehicle, whilst in the operating position B the camera 11 faces optimally to the outside. This protects the lens of the camera 11 against external influences and dirt when the lid element 20 is in the closed position I. Any dirt particles which despite the lid element 20 may reach the interior of the device 100, can therefore not reach the lens of the camera 11 directly. Advantageously, the device 100 according to the invention can be used as a parking aid in the rear area or as a front view camera in the front area of the motor vehicle.

While various inventive aspects, concepts and features of the general inventive concepts are described and illustrated herein in the context of various exemplary embodiments, these various aspects, concepts and features may be used in many alternative embodiments, either individually or in various combinations and sub-combinations thereof. Unless expressly excluded herein all such combinations and sub-combinations are intended to be within the scope of the general inventive concepts. Still further, while various alternative embodiments as to the various aspects, concepts and features of the inventions (such as alternative materials, structures, configurations, methods, circuits, devices and components, alternatives as to form, fit and function, and so on) may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the general inventive concepts even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention. Descriptions of exemplary methods or processes are not limited to inclusion of all steps as being required in all cases, nor is the order that the steps are presented to be construed as required or necessary unless expressly so stated.

LIST OF REFERENCE SYMBOLS 1 car body/structural part/vehicle surface
2 opening
10 camera unit
11 camera
12 adapter
13 electronic unit
14 wiper
15 wiper frame
20 lid element
21 fastening element
23 fastening means for the drive lever
24 fastening means for the actuating lever
30 gear lever
31 first shank of gear lever
32 second shank of gear lever/pivot arm
33 apex of gear lever
40 actuating lever
41 first shank of actuating lever
42 second shank of actuating lever/slide
43 apex of actuating lever
50 gear
51 motor
52 gear shaft
60 gear unit
61 first tooth wheel
62 second tooth wheel
63 third tooth wheel
64 covering hood
70 mounting member
71 cover
72 fastening ring
100 device
I closed position of lid element 20
II open position of lid element 20
A idle position of camera unit 10
B operating position of camera unit 10
C driving axis of drive lever 30
D bearing axis of drive lever 30
E actuating axis of actuating lever 40
F fastening axis of actuating lever 40

The invention claimed is:

1. A device with a camera unit used for taking pictures of the outside of a motor vehicle, and a lid element movable via a drive between a closed position, in which the lid element covers an opening of the device, and an open position, in which the lid element exposes the opening;
   wherein in the closed position of the lid element, the camera unit is inaccessible from the outside behind the lid element and in the open position of the lid element pictures can be taken;
   wherein the lid element is an actuating element for the camera unit for moving the camera unit between an idle position and an operating position; and
   wherein the lid element comprises an actuating lever that interacts with the camera unit in such a way that the camera unit is pivotable between the idle position and the operating position;
   wherein the lid element comprises a drive lever drivable by the drive for the moving lid element between the closed position and the open position;
   wherein the drive comprises a gear unit which serves to at least one of drive and support the lid element, in particular the drive lever;
   wherein the drive lever is pivotably mounted on the lid element about a bearing axis, and that in particular the drive lever is pivotably arranged on the gear unit about a driving axis; and
   wherein at least one of the drive lever and the actuating lever are either substantially L-shaped or substantially V-shaped.

2. the device according to claim 1, wherein in particular the gear unit is implemented as a tooth wheel gear unit, wherein in particular the gear unit is self-locking.

3. The device according to claim 1, wherein the actuating lever interacts with the camera unit in such a way that an angle between the camera unit in the idle position and the camera unit in the operating position is about 90°.

4. The device according to claim 1, wherein the camera unit is arranged on the lid element, in particular on the actuating lever and that in particular the actuating lever and the camera unit together form a single unit.

5. The device according to claim 1, wherein the camera unit comprises a camera, wherein the actuating lever comprises a slide for receiving the camera of the camera unit for exchangeably receiving the camera of the camera unit and in that in particular the camera unit comprises an adapter for the camera of the camera unit.

6. The device according to claim 1, wherein a mounting member is provided in the form of a first housing shell on which the drive and/or a gear unit is/are arranged.

7. The device according to claim 6, wherein the actuating lever is pivotably mounted on the lid element about an actuating axis, and in that in particular the actuating lever is pivotably mounted on the mounting member about a fastening axis.

8. The device according to claim 6, wherein the mounting member comprises mounting means which serve to attach the device to the motor vehicle, in particular to a vehicle body or a structural part, wherein in particular the mounting member can be attached from the outside to the motor vehicle, in particular to the vehicle body or the structural part.

9. The device according to claim 6, wherein the mounting member comprises a cover in the form of a second housing shell which essentially covers and/or seals the camera unit and/or the drive and/or the gear unit.

10. The device according to claim 1, wherein the opening comprises a collar element against which the lid element is supported when the lid element is in the closed position, wherein in particular, when the lid element is supported, the collar element has a cushioning effect and/or serves as a seal.

11. A method for actuating a device with a camera unit serving to take pictures of the outside of a motor vehicle, and with a lid element movable via a drive between a closed position, in which the lid element covers an opening of the device, and an open position, in which the lid element exposes the opening, wherein in the closed position of the lid element the camera unit is inaccessible from the outside behind the lid element and in the open position of the lid element pictures can be taken;

wherein the drive drives the lid element;

wherein the lid element moves the camera unit, in particular exclusively, between an idle position and an operating position;

wherein the lid element comprises an actuating lever which interacts with the camera unit in such a way that the camera unit is pivotable between the idle position and the operating position;

wherein the lid element comprises a drive lever drivable by the drive for the moving lid element between the closed position and the open position;

wherein the drive comprises a gear unit which serves to at least one of drive and support the lid element, in particular the drive lever;

wherein the drive lever is pivotably mounted on the lid element about a bearing axis, and that in particular the drive lever is pivotably arranged on the gear unit about a driving axis; and wherein at least one of the drive lever and the actuating lever are either substantially L-shaped or substantially V-shaped.

12. A method for actuating a device according to claim 1.

* * * * *